April 7, 1953 — A. Y. DODGE — 2,633,939
BRAKE
Filed Jan. 30, 1947 — 2 SHEETS—SHEET 1

Inventor: Adiel Y. Dodge
By Dawson, Brittan, Spangenberg, Attorneys

April 7, 1953     A. Y. DODGE     2,633,939
BRAKE
Filed Jan. 30, 1947     2 SHEETS—SHEET 2
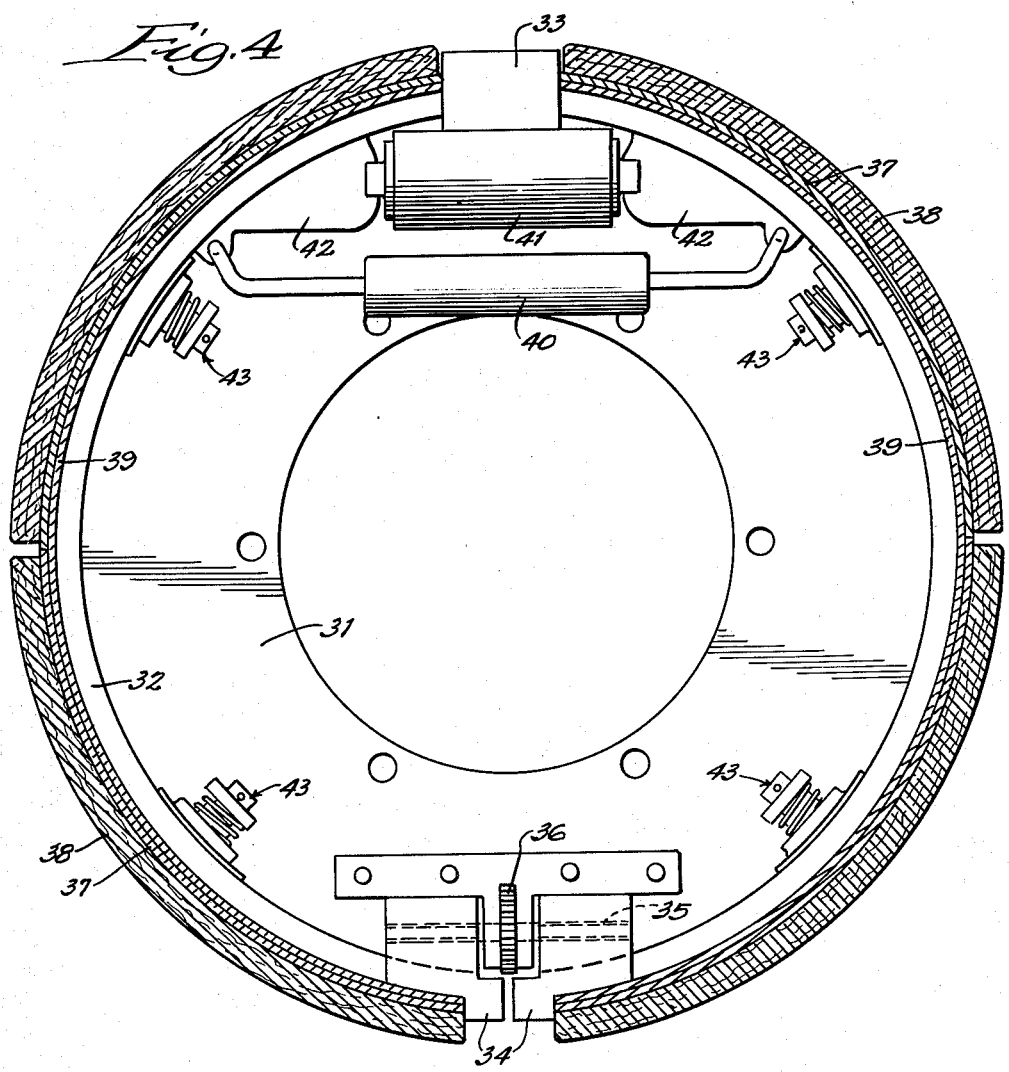
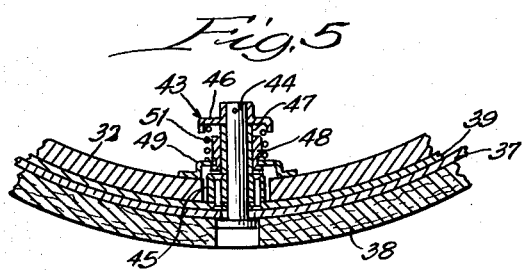
Inventor:
Adiel Y. Dodge,
By Dawson, Booth and Spangenberg,
Attorneys.

Patented Apr. 7, 1953

2,633,939

UNITED STATES PATENT OFFICE 2,633,939

BRAKE

Adiel Y. Dodge, Rockford, Ill.

Application January 30, 1947, Serial No. 725,369

3 Claims. (Cl. 188—78)

This invention relates to brakes and more particularly of the type used on automotive vehicles.

One of the objects of the invention is to provide a brake in which a plurality of segments or shoes are arranged in series so that a preceding segment will assist in applying the following segment to produce a servo action. Preferably, the segments are arranged in pairs between spaced abutments to produce an action approximately equivalent to a half wrap action.

Another object is to provide a brake in which series of segments operate between a fixed abutment and an adjustable abutment which may be adjusted tangentially to take up lost motion. By adjustment of this abutment clicking of the segments or shoes during brake applications may be eliminated and the adjustment may additionally serve to adjust the normal clearance between the shoes and the brake drum.

Still another object is to provide a brake in which setting of the adjustable abutment adjusts the operating means to prevent loss of pedal due to lining wear.

A further object is to provide a brake in which the applying pressures on the several segments are automatically balanced to maintain them properly proportioned to produce substantially equal braking effect and wear on the shoes.

The above and other objects and advantages of the invention will be more readily apparent from the following description when read in connection with the accompanying drawings, in which—

Figure 4 is a view similar to Figure 1 of an alternative construction; and

Figure 5 is an enlarged section of the return spring and automatic adjusting device.

Figure 1:
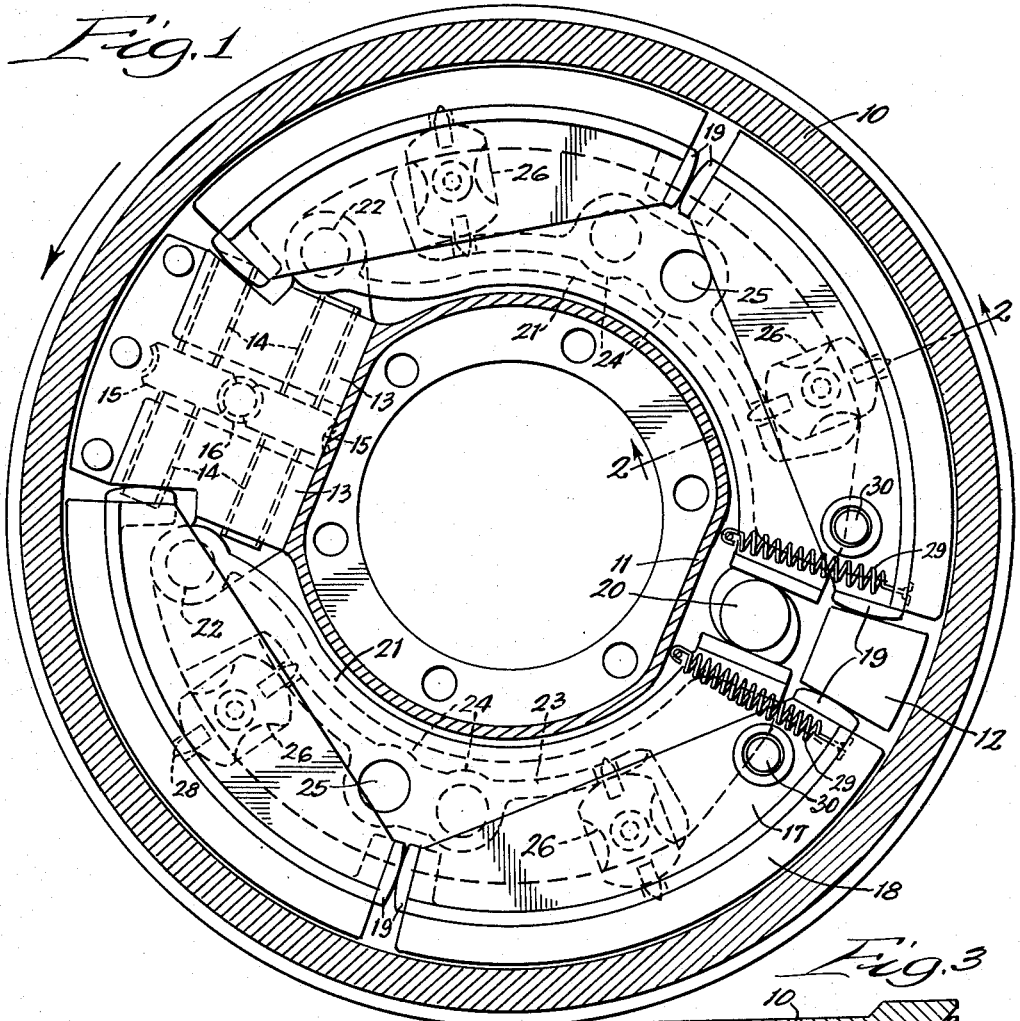
Figure 1 is a transverse sectional view through a brake embodying the invention with parts in elevation.
Figure 2:
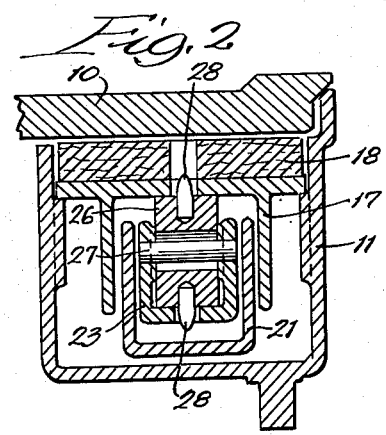
Figure 2 is a partial radial section on the line 2—2 of Figure 1.

The brake as shown in Figures 1 and 2 is adapted for relatively heavy duty operation as, for example, on trucks or the like which are provided with a brake drum 10 having a cylindrical inner surface. The drum 10 may be connected to a wheel or may form a part of the supporting structure of the wheel.

Radially within the drum 10 is a backing plate or support 11 which as seen in Figure 2 may be in the form of an outwardly opening channel registering with the inner surface of the drum. The support carries a pair of abutments, one of which shown at 12 is fixed and is slightly wedge shaped so that its opposite faces lie substantially radial. The other abutment is adapted to be adjusted and for this purpose is formed by a pair of blocks 13 which are movable tangentially on suitable guide means carried by the support. The blocks are formed with pairs of radially spaced openings formed with internal threads of opposite hand to receive the ends of screw members 14 whose end portions are similarly formed with threads of opposite hand. The screw members carry worm gears 15 which mesh with a worm 16. The worm 16 may be formed on a shaft accessible from the exterior of the support so that when the shaft is turned the blocks 13 will simultaneously be moved tangentially away from each other or toward each other to adjust the brake.

The support carries a plurality of shoes or segments which as illustrated at 17 are of channel section opening inwardly and which may if desired taper in radial width toward their ends. The shoes carry friction linings 18 adapted to engage the inner surface of the drum to apply a braking force thereto. As shown, four shoes are employed which are arranged in pairs between the abutments on the opposite sides thereof with the adjacent ends of the shoes of each pair engaging each other. For this purpose the shoes may carry bearing blocks 19 at their ends which are slightly convex properly to engage the abutments and to engage each other. With this construction, each pair of shoes has an action approximately resembling a half wrap band action in both directions.

The shoes are moved outward to engage the drum by operating means shown as comprising a pair of levers 21 which are pivoted at 22 on the blocks 13, respectively. The levers may be curved, as shown, so that their free ends will lie closely adjacent each other radially within the fixed abutment 12 and are preferably channel shaped to fit between the sides of the channel shaped shoes 17. The free ends of the levers are adapted to be spread by any desired type of actuating means shown as a double lobed cam 20. As the cam is turned counterclockwise, as seen in Fig. 1, the free ends of the levers 21 will be spread to move both levers radially outward.

The levers are connected to the shoes and in the construction illustrated, the connection is made through means to equalize the effective pressure on the shoes. The equalizing means, as shown, comprises beams 23, each of which is formed in its center portion with a pair of bored bosses 24. The bosses 24 are adapted to receive pivot pins pivotally to connect the beams to the levers 21, and the pins may enter either of the bosses as desired to change the pivotal position of the beams. In the construction shown pivot pins 25 are supported in the boss closest to the adjustable abutment in the lower lever and in the boss closest to the fixed abutment in the upper lever. This construction provides a shorter lever arm for each of the shoes which precedes the pivotal mounting in the direction of rotation of the drum as indicated by the arrow in Figure 1 so that the applying forces and the wear on the several shoes will be substantially equalized.

The beams are connected adjacent their ends to the central portions of the respective shoes by means of roller members 26 which are formed with arcuately rounded ends to rest against the beams and the inner shoe surfaces. The roller members may be held in place on the beams by pins 27 passing loosely through enlarged openings in the roller members and may be held against slipping on the beams and the shoes by end pins 28 which enter openings in the beams and the shoes, respectively.

Assuming that the drum is turning in the direction of the arrow in Figure 1 and the cam 22 is turned to apply the brakes, the levers will be spread and will move the beams radially outward through the pivot pins 25. The roller members will move the shoes outward into frictional contact with the drum to apply a braking force thereto. That shoe of each pair which is the leading shoe with respect to the rotation of the drum will transmit tangential force to the following shoe to produce a servo effect thereon tending to assist in applying the following shoe. This action is somewhat similar to that of a half wrap band although the effect is not quite the same due to the rigidity of the shoes. Because the shorter lever arm of the pins acts on the leading shoe, a greater radial force will be applied to the first shoe of each pair so that in a normal brake application the total applying forces on the two shoes of each pair will be substantially equal. Over a series of brake applications varying from light to heavy application, the applying forces and the wear on the shoes will average out so that uniform wear on the several shoes will be produced.

Figure 3:
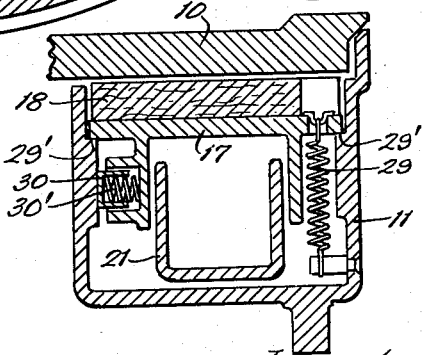
Figure 3 is a broken section view illustrating brake return springs and automatic adjusters.

As shown in Figure 3, the shoes are urged away from the drum by tension springs 29, there being four springs for each shoe connected to pins on the support and to opposite sides of the shoes adjacent their ends. The springs normally urge the shoes against shoulders 29' formed on the support so that the desired amount of clearance exists between the lining and the drum.

In order to maintain the clearance substantially constant as the lining wears, automatic adjusting devices are provided, there being one such device adjacent each of the springs. As shown, each adjusting device comprises a cup shaped plunger 30 slidably carried by a socket in the side flange of the shoe and urged against the inner wall of the channel shaped support by a spring 30'. The plunger 30 has radial clearance in its socket equal to the desired clearance and the friction of the plunger on the support is greater than the force exerted by the return springs but less than that exerted on the shoes during a brake application.

In normal operation the movement of the shoes will just take up the clearance between the plungers 30 and their sockets and the plungers will not move. As the lining wears, the shoes will move out further to slide the plungers outward over the support. Upon release of the shoes the plungers will limit their inward return movement to maintain the clearance constant at the desired value equal to the radial clearance of the plungers in their sockets. In addition, the plungers will limit rocking of the shoes about the rollers 26 and will maintain the shoes parallel to the drum surface at all times.

The adjustable abutment blocks 13 may be properly adjusted to substantially reduce clearance between the abutments and the ends of the shoes so that tangential motion of the shoes will be decreased and clicking will thereby be practically eliminated. As lining wear occurs, the abutment blocks may be spread slightly to take up the clearance and to maintain the normal clearance between the shoes and drums at the desired value. As the blocks are adjusted, the pivots 22 for the operating levers will be moved to maintain the free ends of the levers in proper engagement with the cam 20 so that loss of pedal will not occur. With this construction the same adjustment serves to take up clearance in the shoes and in the operating means and to prevent clicking so that it is the only adjustment required.

The construction shown in Figure 4 is particularly adapted for relatively lighter duty service such, for example, as passenger car use. This brake includes a backing plate or support 31 which is adapted to be mounted in a cylindrical drum similar to the drum 10 of Figure 1 and which includes a cylindrical flange portion 32 lying concentrically within the drum. The flange portion 32 carries a fixed abutment 33 and an adjustable abutment formed by tangentially movable blocks 34 diametrically opposite the abutment 33. The blocks 34 may be moved by a screw 35 having its end portions formed with threads of opposite hand which are threaded into the blocks respectively. The screw may be turned in any desired manner as, for example, by a knurled wheel 36. When the wheel 36 is turned, the blocks 34 will be spread tangentially or moved tangentially together.

Two pairs of brake segments are arranged between the abutments on opposite sides thereof, each segment, as shown, comprising a flexible metal strip 37 carrying a friction lining 38. The outer ends of the segments of each pair engage the fixed abutment 33 and one of the abutment blocks 34 while the adjacent ends of the segments engage each other, as shown.

The segments are adapted to be moved outward into frictional contact with the drum by operating means shown as comprising flexible bands 39 underlying the segments and supported by the annular flange 32. The operating means may be in the form of two band sections each of which is of sufficient length to extend from the fixed abutment to one of the adjustable abutment parts 34. The end of the bands adjacent the fixed abutment 33 may be spread by an actuating means shown as a hydraulic cylinder 41 having a pair of pistons therein which respectively engage vanes 42 on the band ends. The segments and the operating band may be urged toward the support by return spring devices at 40 and 43 which may, if desired, be constructed as more particularly described and claimed in my copending application Serial No. 693,642, filed August 29, 1946, which issued as Patent No. 2,596,379 on May 13, 1952, to provide for automatic adjustment of clearance.

One of the return spring devices 43 is illustrated in detail in Figure 5. As shown, the device comprises a pin 44 having an enlarged head which secures it to the segment strip 37 and which extends through an opening in the operating band 39. Preferably a block 45 is secured to the operating band and extends loosely through an opening in the support 32 so that limited circumferential movement of the band relative to the support is permissible. At its outer end the pin 44 rigidly carries a washer or stop plate 46 and has a friction sleeve 47 thereon between the stop plate and the block 45. A collar 48 has a relatively tight frictional engagement with the sleeve 47 and is formed with a peripheral groove loosely receiving a supporting plate 49. The clearance between the supporting plate and the groove is made equal to the desired initial brake clearance. A compression spring 51 engaging the supporting plate 49 and the washer 46 urges the pin inward.

When the brake is in its released position, the spring will urge the pin 44 inward to move the segments and the operating band toward the support and away from the drum. This movement is limited by engagement of the groove in the collar 48 with the stop plate 49. During normal application when the operating band and segments move outward, the free movement between the groove in the collar 48 and the supporting plate 49 will just be taken up. However, as the lining wears, the segments and operating band will move outward further causing the inner edge of the groove in the collar to engage the stop plate after which the collar will slide on the friction sleeve 47 to a new position. Upon release of the brake, the segments and operating bands move to the extent permitted by the free movement between the stop plate and the groove in the collar, the friction between the collar and the friction sleeve 47 being greater than the force exerted by the spring 51. In this way the clearance will be maintained constant in spite of lining wear.

In operation of this brake when actuating fluid is supplied to the cylinder 41 to spread the pistons, the band ends will be separated to expand the band outward radially. The band will engage the segments and move them outward into frictional contact with the drum. The first or primary shoe of each pair will transmit tangential force to the secondary shoe to produce a servo action approximating the effect of a half wrap action to produce an extremely efficient braking effect.

As lining wear occurs, the abutment blocks 34 may be spread to maintain the clearance constant and to eliminate circumferential clearance between the segment ends and the abutments thereby to reduce or prevent clicking. When the band is in the form of two sections whose ends engage the abutment blocks, adjustment of the blocks will also serve to adjust the band ends thereby to prevent loss of pedal due to wear. When the return spring devices 43 are formed to provide automatic adjustment of clearance, this is not necessary and the band may be continuous from one connecting vane 42 to the other. In this case one end of the band will abut against the fixed abutment 33 while the other end is moved by the cylinder 41 and band clearance will be adjusted solely by the spring devices 43. It will be noted that the operation of the band so far as braking is concerned is the same whether the band is continuous or separated into two sections.

While two embodiments of the invention have been shown and described in detail herein, it will be understood that they are illustrative only and are not to be taken as a definition of the scope of the invention, reference being had for this purpose to the appended claims.

What is claimed is:

1. A brake for use with a cylindrical brake drum comprising a support adapted to be mounted in the drum, a fixed abutment carried by the support, an adjustable abutment spaced diametrically from the fixed abutment and including a pair of tangentially adjustable parts, two series of brake segments between the fixed abutment and the parts respectively with the outer ends of each series engaging the abutment and one of the parts and adjacent ends of adjacent segments in each series engaging each other, a pair of rigid operating levers pivoted at one end respectively to the parts, means carried by the operating levers and operatively engaging the segments respectively to move the segments outward when the operating levers are spread, and actuating means adjacent to the fixed abutment and engaging the free ends of the operating levers to spread them.

2. A brake for use with a cylindrical brake drum comprising a support adapted to be mounted in the drum, a fixed abutment carried by the support, an adjustable abutment spaced diametrically from the fixed abutment and including a pair of tangentially adjustable parts, two series of brake segments between the fixed abutment and the parts respectively with the outer ends of each series engaging the abutment and one of the parts and adjacent ends of adjacent segments in each series engaging each other, a pair of rigid operating levers pivoted at one end respectively to the parts, beams pivoted intermediate their ends to the operating levers, means connecting the ends of the beams to the segments respectively, and actuating means adjacent to the fixed abutment and engaging the free ends of the operating levers to spread them.

3. A brake for use with a cylindrical brake drum comprising a support adapted to be mounted in the drum, a pair of diametrically spaced abutments on the support, two pairs of brake segments lying between the abutments on opposite sides thereof, the segments of each pair engaging each other at their adjacent ends, a pair of operating levers pivoted adjacent one of the abutments and lying radially within the pairs of segments respectively, means to spread the free ends of the levers, a beam pivoted intermediate its ends to the central part of each of the levers, and means connecting the ends of the beams to the segments of the pairs respectively, each of the beams providing a shorter lever arm between its pivot and the end which is connected to the shoe ahead of it in the direction of normal rotation of the drum than between its pivot and the end which is connected to the shoe which follows it.

ADIEL Y. DODGE.

REFERENCES CITED

The following references are of record in the file of this patent:

UNITED STATES PATENTS

| Number | Name | Date |
| --- | --- | --- |
| 1,994,813 | Dodge | Mar. 19, 1935 |
| 2,042,390 | Crary | May 26, 1936 |
| 2,133,669 | Pratt et al. | Oct. 18, 1938 |
| 2,160,055 | Brace | May 30, 1939 |
| 2,167,297 | Fitts | July 25, 1939 |
| 2,206,742 | Dodge | July 2, 1940 |
| 2,348,960 | Cowell | May 16, 1944 |
| 2,350,878 | Cowell | June 6, 1944 |
| 2,407,487 | Forbes | Sept. 10, 1946 |

FOREIGN PATENTS

| Number | Country | Date |
| --- | --- | --- |
| 575,019 | France | July 23, 1924 |